United States Patent [19]

Bainbridge et al.

[11] Patent Number: 4,998,597
[45] Date of Patent: Mar. 12, 1991

[54] INSULATED EXHAUST PIPE ATTACHMENT MEANS

[75] Inventors: David W. Bainbridge; William H. Olbert, both of Littleton, Colo.

[73] Assignee: Manville Corporation, Denver, Colo.

[21] Appl. No.: 386,841

[22] Filed: Jul. 31, 1989

[51] Int. Cl.⁵ .................................................. F01N 7/18
[52] U.S. Cl. .................................. 181/243; 181/228; 181/247; 60/322; 138/109; 138/122; 138/149; 285/47; 285/158; 285/397; 285/903
[58] Field of Search ................ 181/227, 243, 247–250, 181/252, 228; 138/109, 122, 149; 285/47, 333, 397, 417, 903, 921, 157; 60/282, 322

[56] References Cited

U.S. PATENT DOCUMENTS

| | | | |
|---|---|---|---|
| 1,995,840 | 3/1935 | Compo | 181/243 X |
| 4,082,327 | 4/1978 | Sting et al. | 285/903 X |
| 4,345,430 | 8/1982 | Pallo et al. | 60/282 |
| 4,457,544 | 7/1984 | Snow et al. | 285/903 X |
| 4,475,623 | 10/1984 | Gerber et al. | 181/243 |
| 4,653,542 | 3/1987 | Tascher | 138/109 |
| 4,683,917 | 8/1987 | Bartholomew | 138/109 X |

*Primary Examiner*—Benjamin R. Fuller
*Attorney, Agent, or Firm*—John D. Lister; Cornelius P. Quinn

[57] ABSTRACT

Attachment means for connecting an insulated pipe to an element, such as the manifold, in the exhaust system of a vehicle. The attachment means includes a conduit which extends into the end of the insulated pipe. A transverse lug or a helical flange on the conduit engages the spiral corrugations of the inner diameter of the pipe to allow the conduit to be threaded into the pipe. The end of the pipe is received in an end cap slidably mounted on the conduit. When the cap hits a stop on the conduit during threading of the conduit into the pipe the lug or helical flange pulls the pipe against the cap, tightening the connection to the pipe.

10 Claims, 4 Drawing Sheets

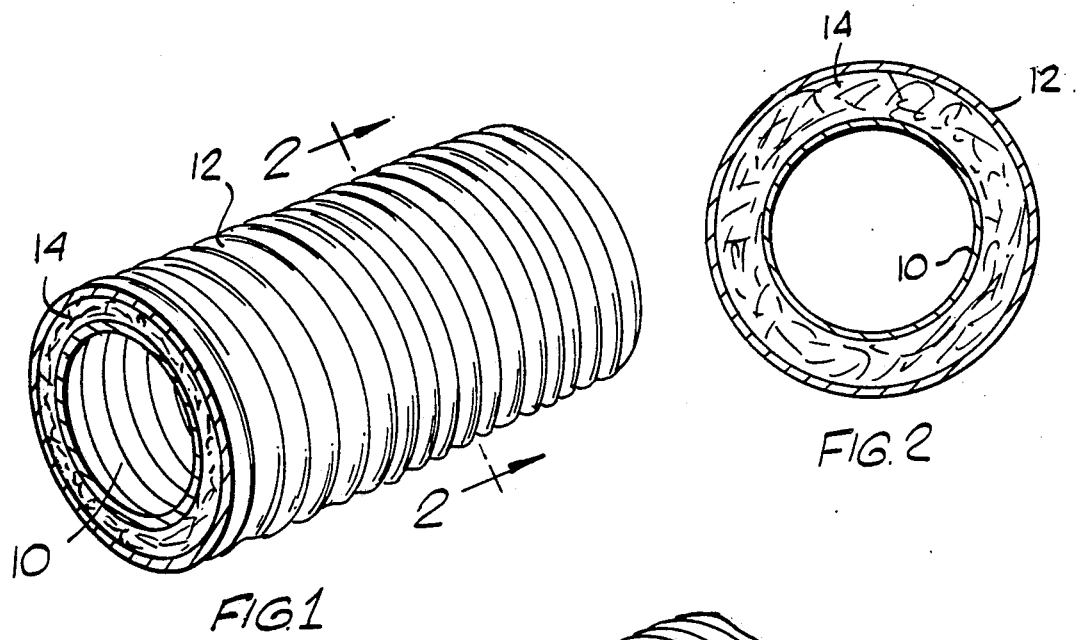
FIG.1
FIG.2
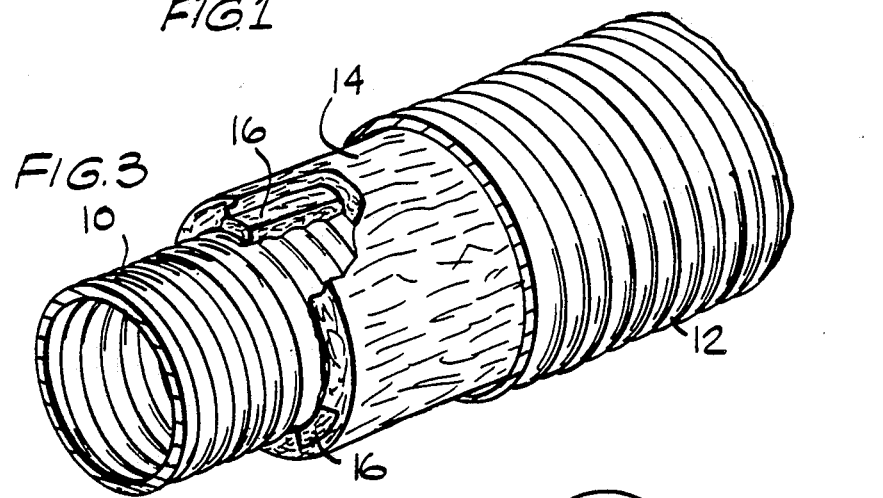
FIG.3
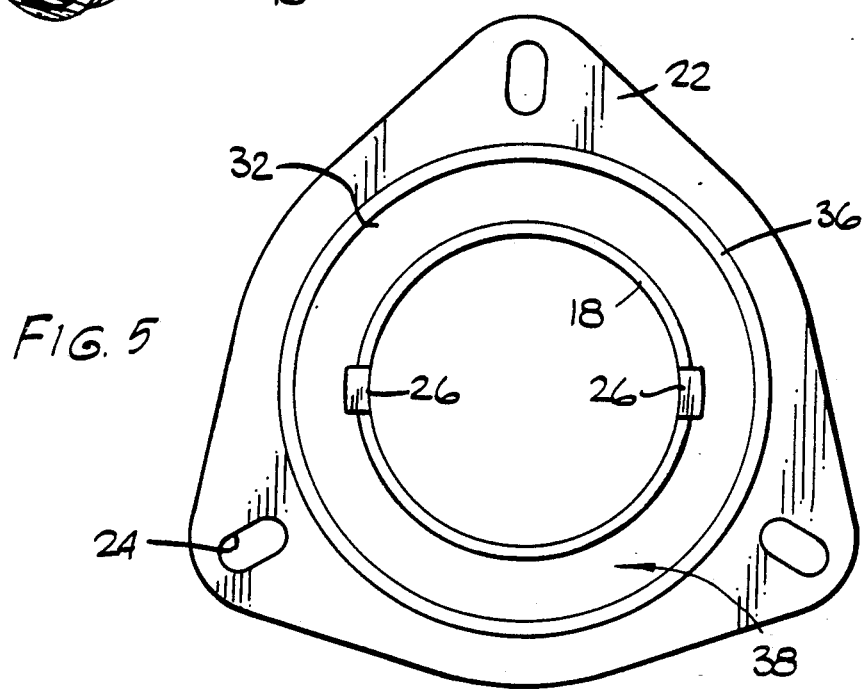
FIG.5

INSULATED EXHAUST PIPE ATTACHMENT MEANS

FIELD OF THE INVENTION

This invention relates to insulated automotive exhaust pipe systems and, more particularly, to means for attaching an insulated exhaust pipe to the engine manifold or another element in the exhaust system.

BACKGROUND OF THE INVENTION

The use of catalytic converters to reduce the output of pollutants from the exhaust of vehicles powered by internal combustion engines has brought out the need to insulate the exhaust pipe leading to the converter in order to deliver gases at high temperatures. Because the catalytic converter does not begin to catalyze the reaction in the converter until its light-off temperature is reached, by reducing the heat loss of the exhaust gases delivered to the catalytic converter the period during which pollutants are released is also reduced, resulting in a lesser total amount of pollutants released to the atmosphere.

Efforts to insulate the exhaust pipe have centered on the use of high temperature insulation on the pipe, with the insulation held in place by another larger pipe concentrically spaced from the exhaust pipe. To withstand the high temperatures of the exhaust gases refractory fiber is the preferred insulating material. To reduce the thermal mass of the exhaust pipe, which also contributes to maintaining the high temperatures of the exhaust gas and thus aids in reducing the catalytic light-off period, very thin metal tubing has been proposed for use as the exhaust pipe.

Exhaust pipe structure of this type is difficult to attach to the manifold or other elements of the exhaust system. The fragile nature of the refractory fiber insulation and the thin metal tubing give the pipe little resistance to crushing or deformation by clamps designed to hold the ends of the pipe in place through high pressures. If the pipe is not securely held in place, however, the vibration to which it would be subjected in time degrades the refractory fibers, reducing them to dustlike particles and destroying their insulating value. Further, the attachment should prevent the escape of gases from the inner tube into the insulation. This can readily occur at the end of the pipe, resulting in the outer pipe being exposed to the hot gases and increasing the heat loss from the exhaust pipe.

It is thus an object of the invention to provide an exhaust pipe attachment means which does not damage the pipe or the insulation but nevertheless holds the pipe securely in place against vibration. It is also an object to prevent exhaust gases from entering the insulation at the end of the pipe.

SUMMARY OF THE INVENTION

In accordance with the invention an attachment conduit is provided which is attached at one end to an element, such as the manifold, in the exhaust system. The other end of the conduit extends into an end of the inner corrugated metallic tube of the insulated pipe. The conduit includes means extending transversely therefrom which engages at least one corrugation of the inner metallic tube to assist in holding the insulated pipe in place. Because the corrugated tube is formed from a spirally wound corrugated metal strip, the corrugations extend at an angle to the axis of the pipe. The transversely extending means on the conduit are also aligned at an angle corresponding to the angle of the corrugations, enabling the conduit to be threaded into the pipe. Preferably, the transversely extending means are lugs comprising ears stamped from the ends of the conduit.

In addition, a cap is slidably mounted on the conduit so that the end of the exhaust pipe is received between the cap and the conduit. This allows the conduit to be freely threaded onto the conduit. A stop on the exhaust pipe is provided to stop the sliding movement of the cap to allow the conduit to be tightly secured to the exhaust pipe. The end of the exhaust pipe would thus be tightly pressed against the end of the cap.

Other features and aspects of the invention, as well as other benefits thereof, will readily be ascertained from the more detailed description of the preferred embodiment which follows.

BRIEF DESCRIPTION OF THE DRAWINGS

FIG. 1 is a pictorial view of the type of insulated exhaust pipe to be attached by the attachment means of the present invention to an element of an automotive exhaust system;

FIG. 2 is a transverse sectional view taken along line 2—2 of FIG. 1;

FIG. 3 is a pictorial view of a modified insulated exhaust pipe to be attached by the attachment means of the present invention;

FIG. 5 is an end view of the attachment means with the slidable cap shown mounted on the attachment conduit;

DESCRIPTION OF THE PREFERRED EMBODIMENT

Referring to FIG. 1, the exhaust pipe attachment means of the present invention is designed to be used in connection with an insulated exhaust pipe of the type shown in FIGS. 1 and 2. In this exhaust pipe arrangement the annular space between the inner and outer corrugated metallic tubes 10 and 12, respectively, is filled with high temperature insulation such as refractory fiber insulation 14. The corrugated tube walls are typically very thin, in the range of 0.005 inch to 0.010 inch, in order to reduce the weight of the pipe and to reduce the thermal mass as a means of minimizing heat loss. The corrugated tubes are typically produced by introducing a corrugated strip at an angle to a forming mandrel and attaching adjacent strips to each other along a seam. This produces a tube the corrugations of which extend helically about its periphery in much the same manner as the thread of a screw. A more complete description of an insulated exhaust pipe of this type and its manufacture may be found in application Ser. No. 07/386,754 filed of even date herewith in the name of David William Bainbridge.

Because refractory fibers are very fragile, the clamping attachment to the exhaust system must hold the pipe firmly in place to prevent undue vibration that can cause the fibers to be reduced to dust-like particles. Even when using a pipe such as that shown in FIG. 3, described in more detail in the aforementioned application Ser. No. 07/386,754, wherein spacer strips 16 of higher density refractory fiber are embedded in the low density fiber layer to hold the low density fibers in place as a preventive measure against the effects of vibration, it is still essential that the pipe attachment hold the pipe solidly in place. Moreover, the clamp cannot be made so tight that the tube ends are squeezed together, as this could result in metal-to-metal contact, which is detrimental to the heat and sound insulating properties of the pipe, and in crushing the fibers, thereby destroying much of their insulating value at that location.

Figure 4:
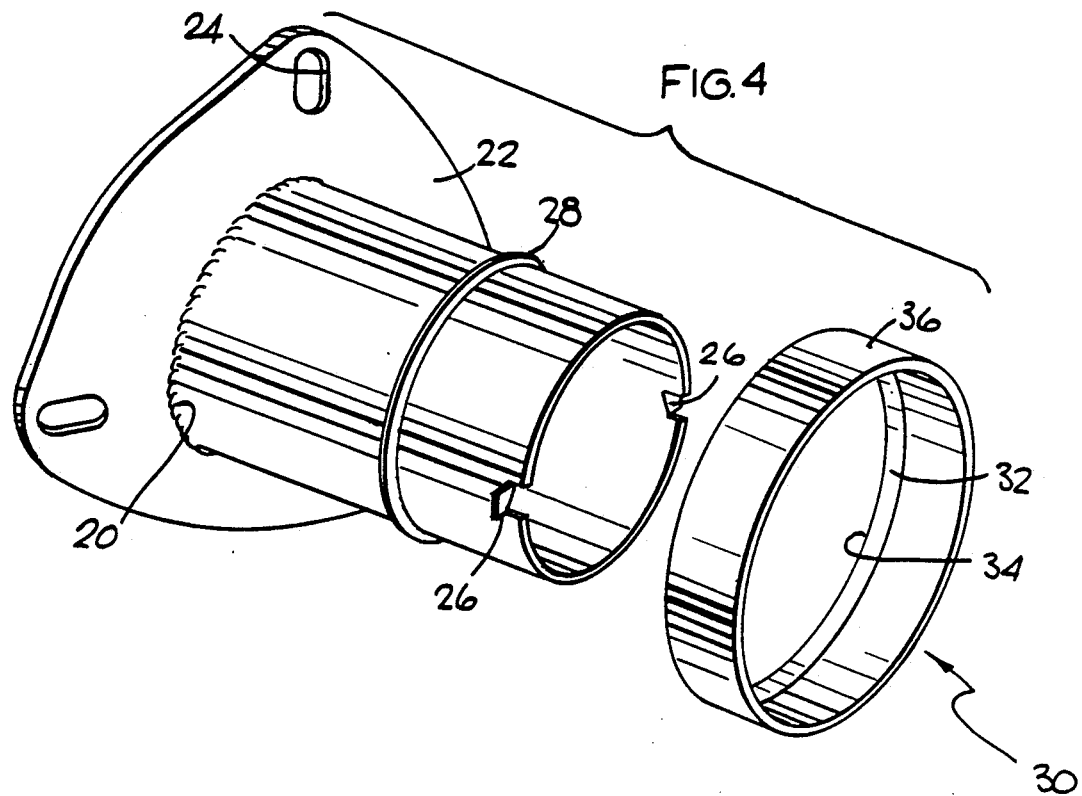
FIG. 4 is an exploded pictorial view of the attachment means of the invention.

Referring to FIGS. 4 and 5, the exhaust pipe attachment of the invention comprises a conduit 18 welded at one end, as at 20, to a mounting flange 22. The mounting flange contains three equally spaced elongated bolt holes 24 to facilitate mounting the assembly to a manifold or other element in an automotive exhaust system. At the other end of the conduit tabs 26 have been stuck from the conduit end for a purpose to be explained hereinafter. Spaced from the tabs is a circumferential protrusion 28 which acts as a stop for cap 30. The cap 30 comprises an end wall 32 containing an opening 34 through which the conduit fits. The opening is large enough to allow the cap to slide on the conduit but is smaller than the protrusion 28. Extending axially of the conduit and spaced therefrom is a sleeve portion 36. The sleeve portion is thus concentrically arranged with respect to the conduit and forms with the conduit an annular space 38.

Figure 6:
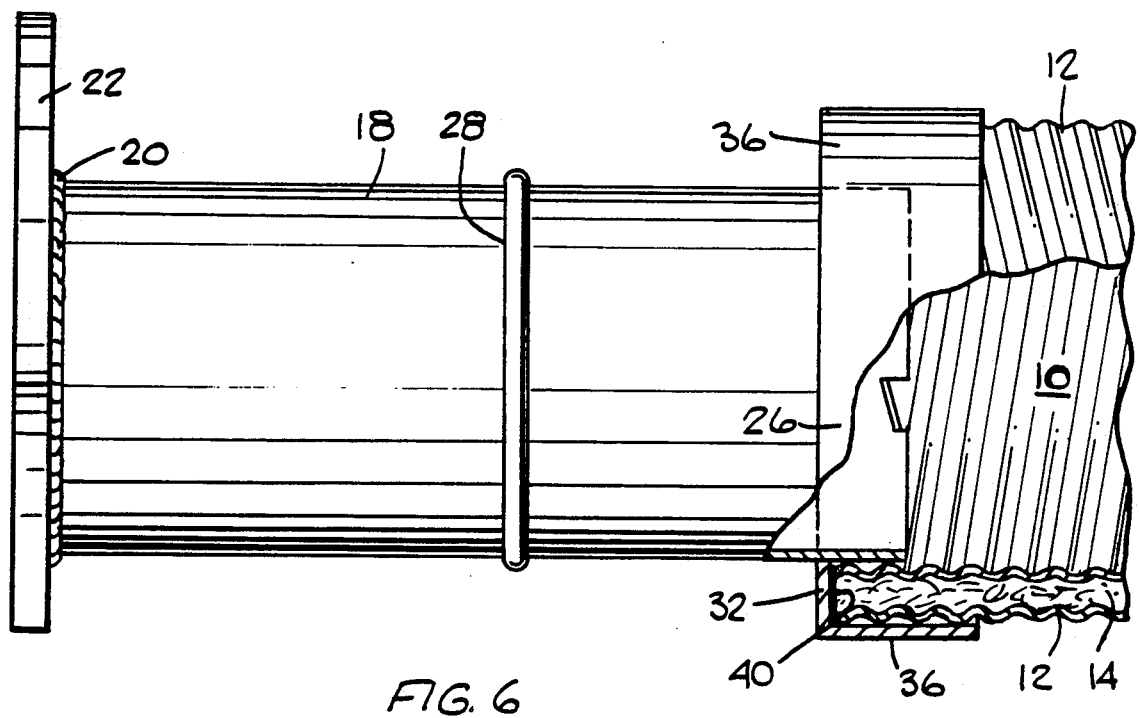
FIG. 6 is an enlarged partial sectional view showing the attachment means in the initial stage of being threaded into the end portion of an exhaust pipe.

Turning now to FIG. 6, to install the attachment to a corrugated insulated exhaust pipe the end of the conduit containing the tabs 26 is aligned with the exhaust pipe so that the pipe fits into the annular space between the conduit 18 and the sleeve portion 36 of the cap. The conduit is then rotated in a direction corresponding to the alignment of the corrugations of the pipe. Thus the conduit 18 is rotated so that each of the tabs 26 engages a corrugation on the inside diameter of the inner tube 10. Rotation of the conduit will then cause the engagement of the tabs and corrugations to have a threading action, resulting in the exhaust pipe being drawn toward the mounting flange. Because the cap 30 is slidably mounted on the conduit 18, the drawing of the pipe toward the mounting flange results in the pipe pushing the cap to slide it along the conduit in the same direction. The initial stage of such a threading action is illustrated in FIG. 6.

Figure 7:
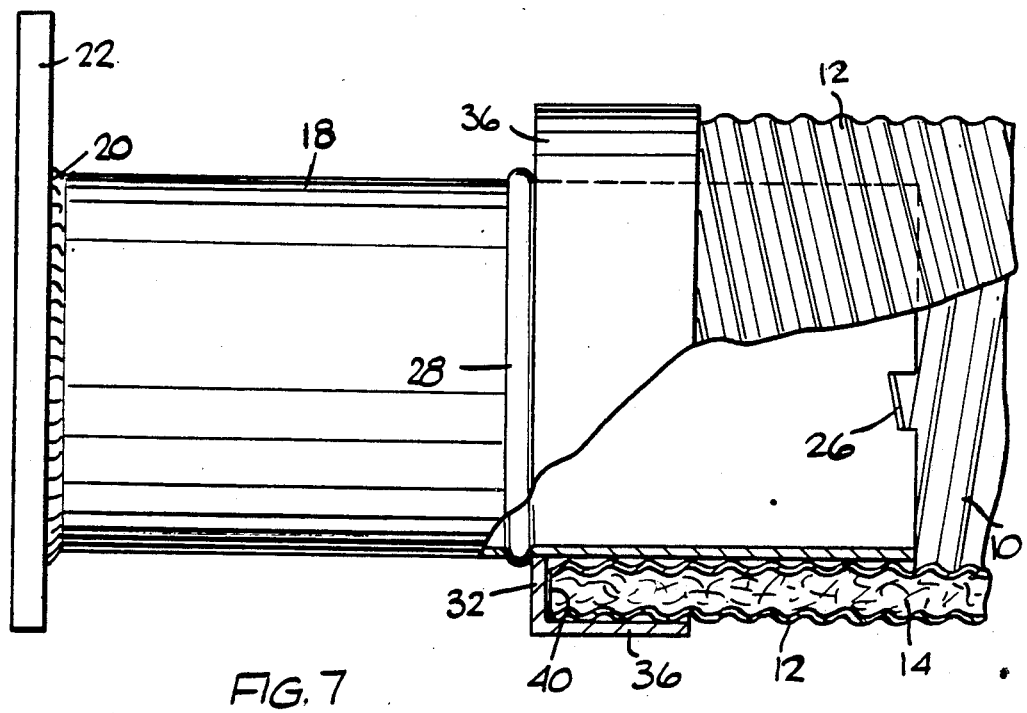
FIG. 7 is an enlarged partial sectional view showing the attachment means after it has been fully threaded into the end portion of an exhaust pipe.

Continued rotation of the conduit will cause the conduit to move into the pipe until the cap is pushed against the protrusion 28. The protrusion thus acts as a stop to the threading action. When this occurs the conduit is turned still more to apply a torque to the conduit to secure the end of the pipe tightly against the end wall 32 of the cap. This final stage of the threading action is illustrated in FIG. 7. Preferably, a coating of ceramic adhesive is first applied to the end wall 32 to act as a seal or gasket to further assure against the escape of exhaust gases into the fibrous insulation 14.

To provide for the threading action to take place it is necessary to align the tabs 26 at an angle to the axis of the attachment which corresponds to the angle of the corrugations of the inside diameter of the inner pipe 10. Obviously, the angle will be the same as the angle at which the corrugated strip used to form the corrugated tube 10 has been fed to the axis of the forming mandrel. While this may vary, an angle of 20° from a plane extending at right angles through the axis of the conduit 18 would be typical.

Although the tabs 26 have been described as being formed by striking them from the end of the conduit, this is just one way in which they may be provided. Any transversely extending lugs lying at the proper angle would perform the same function, regardless of whether they are an integral part of the conduit, as the struck tabs would be, or are separate extensions affixed, as by welding, to the conduit. Although two tabs have been disclosed as the preferred arrangement due to the ease with which the threading operation can be carried out and for the holding power they provide, the number of tabs or lugs is not limited to two. One or even three or more lugs may be used as long as the desired function is provided.

The protrusion 28 in the conduit 18 has been described as circumferential or annular. This is the preferred arrangement because it can readily be formed by stamping a groove in the inside diameter of the conduit which results in a bulge or protrusion on the outside diameter. Any form of stop means can be used, however, as long as it is strong enough to withstand the pressure of the end cap being pushed against it due to the torque applied during the attachment operation. For example, tabs could be struck up from the conduit wall at spaced peripheral locations, or separate stop members could be welded to the conduit.

Figure 8:
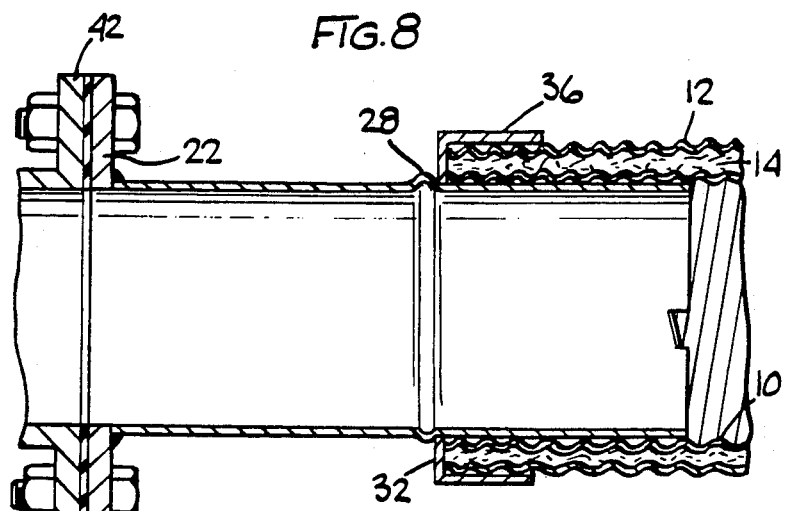
FIG. 8 is a transverse sectional view showing the attachment means connected to the manifold of an automotive engine.

Once the attachment has been permanently secured in place the mounting flange can be aligned with the mounting holes in the exhaust system element to which the exhaust pipe is to be attached, and the mounting flange can be bolted to the element. Thus in FIG. 8 the pipe attachment is shown bolted to the attachment flange 42 of the engine manifold of an automotive engine. The three bolt holes 24 provided in the mounting flange 22 make it possible for them to be aligned with the holes in the attachment flange 42 with only a small amount of rotation of the attachment means being required. The exhaust pipe can readily absorb this degree of torque or stress during installation due to its helical corrugated design. This would not be possible with the more conventional solid or welded bellows type of exhaust pipe. Because the pipe design makes it possible to use a flat mounting flange such as that shown at 22, a smaller amount of space is taken up on installation, resulting in a greater portion of the length of the exhaust pipe system being insulated.

Figure 9:
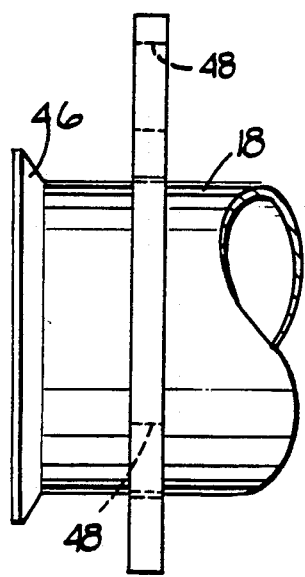
FIG. 9 is a partial side view showing a modified mounting flange arrangement.

As shown in FIG. 9, a different mounting flange arrangement can be used if it is desired to apply less torque to the pipe when attaching it to the manifold or other element in the exhaust system. The flange 44 is slidably mounted on the conduit 18 and is used in conjunction with a flared portion 46 on the end of the conduit. This enables the mounting flange to be rotated to align the mounting holes with the mounting holes in the attachment flange of the manifold or other element. While this design has the advantage of lessening the stress on the exhaust pipe during mounting, it has the disadvantage of requiring more space for maneuvering during the mounting operation, requiring the length of the conduit between the mounting flange and the annular stop to be increased, thereby resulting in less of the exhaust pipe system being insulated.

Figure 10:
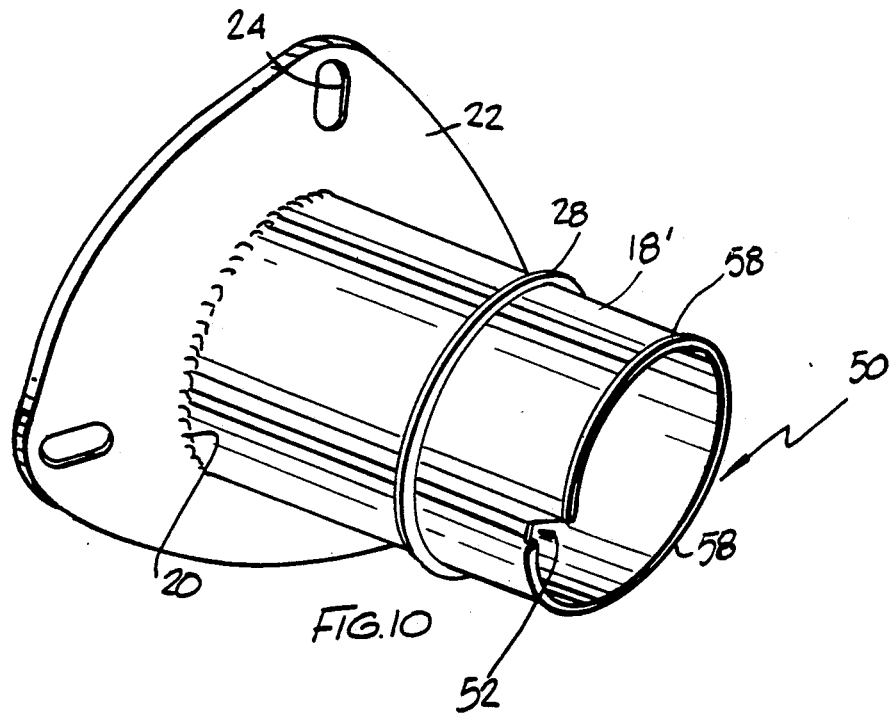
FIG. 10 is a pictorial view of a modified attachment tube.
Figure 11:
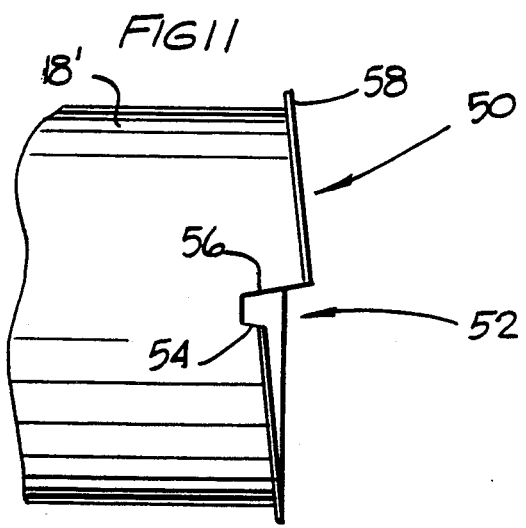
FIG. 11 is a front elevational view of the modified attachment tube of FIG. 10.

If desired a variation of the exhaust pipe attachment may be used such as that shown in FIGS. 10 and 11, wherein like reference numerals to those of FIG. 4 denote like elements. In this embodiment the tube 18' does not have a straight-cut end with tabs but is provided instead with a helical end portion 50. The side edges of a notch or cutout 52 in the end of the tube 18' allow for the end of the tube to be helically shaped, the helical end portion beginning at the short side edge 54 and ending at the long side edge 56. The helical end portion 50 is formed with a rim or flange 58 which engages with the corrugations on the inside diameter of the inner tube of an insulated exhaust pipe to thread the attachment and pipe toward the mounting flange as in the embodiment of FIG. 4. The helical end portion provides greater surface contact with the corrugations than the tabs of the embodiment of FIG. 4 and can exert more force on the tube during the mounting operation.

It should now be understood that the invention is not necessarily limited to all the specific details described in connection with the preferred embodiment but that changes which do not affect the overall basic function and concept of the invention may be made by those skilled in the art without departing from the spirit and scope of the invention, as defined in the appended claims.

What is claimed is:

1. In the exhaust system of a vehicle powered by an internal combustion engine, wherein the exhaust system includes an insulated pipe comprising an inner corrugated metallic tube and an outer metallic tube, the outer metallic tube being spaced from and concentrically arranged with respect to the inner metallic tube, and refractory fiber insulation filling the space between the inner and outer tubes, the improvement comprising:

a conduit having two ends, one end of which is attached to an element in the exhaust system and the other end of which extends into the inner metallic tube of the insulated pipe at one end of the insulated pipe;

means on the conduit extending transversely therefrom and engaging at least one corrugation of the inner metallic tube to assist in holding the insulated pipe in place on the conduit;

corrugations of the inner corrugated tube being at a known angle to a length of the tube, and the transversely extending means being aligned at an angle to the conduit corresponding to said known angle, whereby the engagement of the transversely extending means with the corrugations permits the conduit to be threaded into the insulated pipe;

a cap having a sleeve portion concentrically arranged with and spaced from the conduit and an end portion connected to the sleeve portion, the end portion being slidably mounted on the conduit, said one end of the insulated pipe extending into the space between the conduit and the sleeve portion of the cap and abutting the end portion of the cap; and the conduit further including a stop extending transversely therefrom, whereby threading of the conduit into the insulated pipe causes relative movement between the insulated pipe and the conduit, the insulated pipe causing the cap to slidably move on the conduit until the end portion of the cap engages the stop.

2. The improvement of claim 1, wherein the transversely extending means comprises at least one lug extending from said other end of the conduit.

3. The improvement of claim 2, wherein the lug comprises an ear stamped from said other end of the conduit.

4. The improvement of claim 1, wherein the transversely extending means comprises a helically extending flange on said other end of the conduit.

5. The improvement of claim 4, including a notch in the other end of the conduit, the helically extending flange beginning and ending at the notch.

6. The improvement of claim 1, wherein the stop comprises a transversely extending bulge in the conduit.

7. The improvement of claim 1, further including refractory adhesive between the end of the insulated pipe and the end portion of the cap.

8. The improvement of claim 1, further including an attachment flange connected to said one end of the conduit, the attachment flange being adapted to be connected to an element in the exhaust system.

9. The improvement of claim 8, wherein the attachment flange is connected to said one end of the conduit by a weld.

10. The improvement of claim 8, wherein the attachment flange is slidably mounted on the conduit, and further including a flared end portion on said one end of the conduit, the attachment flange engaging the flared end portion to connect the conduit to said element in the exhaust system.

* * * * *